United States Patent [19]

Newman et al.

[11] Patent Number: 4,879,147

[45] Date of Patent: Nov. 7, 1989

[54] POLYMERIC MULTILAYER SHEET SUITABLE FOR THE MANUFACTURE OF MICROWAVEABLE CONTAINERS

[75] Inventors: Frederick C. Newman, Weston, Conn.; Louis J. Marsella, Freemont, Calif.

[73] Assignee: Continental Can Company, Inc., Norwalk, Conn.

[21] Appl. No.: 3,437

[22] Filed: Jan. 15, 1987

[51] Int. Cl.$^4$ ............................................. B27N 5/02
[52] U.S. Cl. ..................................... 428/35; 428/323; 428/516
[58] Field of Search .................. 428/517, 35, 323, 516

[56] References Cited

U.S. PATENT DOCUMENTS

| | | | |
|---|---|---|---|
| 4,080,359 | 3/1978 | Yui et al. .............................. | 524/305 |
| 4,292,358 | 9/1981 | Bonis .................................... | 428/517 |
| 4,440,824 | 4/1984 | Bonis .................................... | 428/517 |
| 4,464,439 | 8/1984 | Castelein ............................. | 428/517 |

FOREIGN PATENT DOCUMENTS 163656  9/1983  Japan .................................. 428/517

*Primary Examiner*—Edith Buffalow
*Attorney, Agent, or Firm*—Paul Shapiro

[57] ABSTRACT

A multilayer plastic sheet adapted for the manufacture of containers for food products to be cooked or reheated in microwave ovens is disclosed wherein the sheet has at least one layer of a propylene polymer composition bonded to the surface of a styrene polymer layer, the propylene polymer layer having incorporated therein about 20 to about 40 percent by weight of an inorganic filler such as talc, the filled propylene polymer and the styrene polymer layer having a melt flow substantially equal to the other and the thickness of the layers being at a ratio of from about 60:40 to about 40:60.

12 Claims, No Drawings

POLYMERIC MULTILAYER SHEET SUITABLE FOR THE MANUFACTURE OF MICROWAVEABLE CONTAINERS

BACKGROUND OF THE INVENTION

1. Field of the Invention

This invention relates to a multilayer sheet material suitable for the packaging of foodstuffs and more particularly to a polymeric multilayer sheet material particularly adapted for use in making containers for food products to be cooked or reheated in microwave ovens.

2. The Prior Art

The widespread popularity of microwave ovens has initiated interest in a plastic container which can be used for the packaging of foods and which can withstand the temperature demands of cooking and reheating the food product in microwave ovens. Microwave ovens are popular with consumers because of the speed at which such ovens can cook or reheat food. Containers used in microwave ovens are heated only by the heat conducted from the food being cooked. Although the temperature demands of microwave cooking are less than that of conventional ovens, the temperatures that are generated from the food product still deleteriously affect the dimensional stability of containers formed from single or multilayer plastic sheets thermoformed from polyolefinic materials such as propylene polymers and copolymers.

In addition to plastic containers made solely from polyolefinic materials as just described, the art also has under consideration containers for the packaging of oxygen-sensitive foods intended for storage under non-refrigerated conditions which can be subject to microwave conditions. These containers are formed from multilayer sheets constructed of an inner barrier layer, juxtaposed adhesive layers on both sides of the barrier layer and outer layers of a polyolefin. For example, British Pat. No. 1,379,106 discloses a five-layer sheet comprised of an inner gas barrier layer formed of a copolymer of vinylidene chloride and vinyl chloride, an ethylene/vinyl acetate copolymer adhesive layer on either side of the barrier layer and an outer layer of a polyolefin such as polyethylene, polypropylene or ethylene/propylene copolymer. The multilayer sheets are disclosed as being ideally suited for making containers of a variety of forms for products that are sensitive to oxygen.

The multilayer sheets of the prior art are conventionally made in a single process step by coextruding two or more polyolefinic layers and intermediate layers comprised of an adhesive tie layer material into a continuous sheet to form a unitary structure. In the case of multilayer gas barrier sheets, an inner layer of a gas barrier material is coextruded with the polyolefinic and adhesive layers.

A multilayer sheet structure having gas barrier properties which has been found particularly suitable for the manufacture of plastic containers used for the packaging of oxygen sensitive food products is constructed of an inner gas barrier layer such as ethylene vinyl alcohol (EVOH) or vinylidene chloride polymer (SARAN), first and second adhesive tie layers applied to each side of the barrier layer, a first outer layer of low or high density polyethylene, bonded to the first adhesive layer and a propylene polymer or styrene polymer layer bonded to the second adhesive layer.

Containers thermoformed from such multilayer gas barrier sheet are utilized in the packaging of oxygen-sensitive food products which are intended for storage under non-refrigerated conditions. In such application, the containers are formed using a sterile multilayer gas barrier film, and while in a still heated state from the forming station are filled with sterile food product in a filling station inside a sterile enclosure. The filled containers are then sealed without it being possible for their contents to be contaminated by a non-sterile atmosphere with a lid sheet whereof at least the side of the lid facing the inside of the containers is sterile. A specific method which may be utilized for sterile packaging of the type generally described above is disclosed in U.S. Pat. No. 4,287,802.

Multilayer sheets of the non-barrier and gas barrier type can be converted to containers using conventional thermoplastic forming techniques such as thermoforming. In thermoforming, the multilayer sheet material is thermoformed by feeding the sheet from roll stock past a heating station where the sheet is heated, usually by passage through an oven or overhead radiant heaters or a combination of both and the heated sheet passes directly to a thermoforming machine which forms the container. Any suitable thermoforming technique such as vacuum forming, pressure forming, plug assist or mechanical forming or any combination of such techniques can be used in the forming of the containers but in all cases the sheet material is preheated generally to temperature of about 375° F. to about 425° F. to effect a degree of softening of the material so that it can be easily thermoformed into containers having uniform sidewalls of the desired thickness.

One drawback to the plastic containers formed from multilayer sheet of the types above described is that the containers are not microwaveable, i.e. the containers when filled with food product and exposed to heating in a microwave oven exhibit poor dimensional stability and often undergo distortion and shrinkage.

SUMMARY OF THE INVENTION

In accordance with the present invention there is provided a multilayer sheet suitable for the manufacture of food containers which can withstand exposure to microwave heating of the food product without significant loss of dimensional stability, wherein the multilayer sheet is comprised of a layer of a propylene polymer bonded to a styrene polymer layer, the propylene polymer having incorporated therein about 20 to 40 percent by weight of an inorganic filler, the filled propylene polymer and styrene polymer layers having a melt flow substantially equal to the other and the filled propylene and styrene polymer layers having a thickness ratio in the range of about 60:40 to about 40:60.

Containers thermoformed from the multilayer sheet prepared in accordance with the present invention can withstand heating in microwave ovens without significant loss of dimensional stability.

DETAILED DESCRIPTION OF THE INVENTION

In accordance with the present invention the multilayer sheet structures hereof are conveniently made by lamination of the individual layers of the sheet simultaneously, as by coextrusion.

The term "propylene polymer" as used in the present application includes within its meaning homopolymers of propylene and copolymers of propylene with other ethylenically unsaturated monomers such as ethylene.

The propylene polymer layer may be from about 10 to 40 mils thick and preferably about 15 to 25 mils thick.

The term "styrene polymer" includes the vinyl aromatic or styrenic polymers including substituted and unsubstituted styrene polymers and copolymers and high impact polystyrenes comprised of styrene/rubber blends and copolymers. A high impact styrene polymer available commercially under the trade mark designation Mobil 4600 having a melt flow of about 2.7 g/10 min. (ASTM test method D1238) has been found suitable as the styrene layer in the multilayer sheet constructions of the present invention. Generally high impact styrene polymers useful in the practice of the present invention have a melt flow in the range of about 1.5 to about 30 g/10 min. (ASTM test method D1238), and preferably about 2.0 to about 2.8 g/10 min.

It is critical to the practice of the present invention that the thickness ratio of the filled propylene polymer layer to the styrene polymer layer be about 60:40 to about 40:60 and preferably about 50:50.

The filler incorporated in the propylene polymer composition used in the manufacture of the multilayer sheet of the present invention generally comprises about 20 to about 40 percent by weight of the propylene polymer composition. The filler has preferably a laminated structure and is preferably used in a finely divided form, i.e. an average particle size of about 5 to about 15 microns. Suitable filler materials include silica and talc with talc being preferred. The propylene polymer compositions filled with about 20 to about 40 percent by weight filler useful in the practice of the present invention have a melt flow in the range of about 1.5 to about 3.0 g/10 min. (ASTM test method D1238) and preferably about 2.0 to 2.5 g/min.

Multilayer gas barrier sheet useful in the preparation of microwavable plastic containers in accordance with the practice of the present invention are generally comprised of an inner gas barrier layer, an outer layer of a first polyolefin composition bonded to one of the barrier surfaces, an outer layer of a propylene polymer bonded to the other surface of the barrier layer and a styrene polymer layer bonded to the propylene polymer layer, the propylene layer having incorporated therein about 20 to about 40 percent by weight of the filler, the filled propylene polymer and styrene polymer layers having a melt flow substantially equal to the other, both being in the range of about 1.5 to about 3.0 g/min (ASTM test method D1238) and the thickness ratio of the filled propylene polymer layer to the styrene polymer layer being in the range of about 60:40 to 40:60 and preferably about 50:50.

In the preparation of the multilayer gas barrier sheet the outer first polyolefin layer may be from about 5 to about 15 mils thick and is preferably from about 8 to about 10 mils thick. By the term "polyolefin" as used herein is meant polyethylene, polypropylene and random copolymers of ethylene and/or propylene with less than 50 percent by weight of other ethylenically unsaturated monomer or block copolymers of ethylene and propylene with less than 50 percent by weight of the other copolymer. Polyethylene, either low or high density polyethylene, is preferred as the composition of the first polyolefin outer layer.

A wide variety of barrier materials may be employed as the inner barrier layer of the multilayer gas barrier sheet in accordance with the present invention. Particularly advantageous and beneficial are compositions of vinylidene chloride polymers, wherein the polymers contain at least 70 weight percent vinylidene chloride, the remainder being one or more ethylenically unsaturated monomers copolymerizable therewith such as vinyl chloride. Ethylene vinyl alcohol copolymers are derived from hydrolyzed ethylene vinyl acetate copolymers containing from 15 to 65 mole percent ethylene and 85 to 35 mole percent of vinyl acetate.

The inner barrier layer may be from about 2 to about 10 mils in thickness and is most advantageously from about 3 to about 5 mils thick.

In constructing the multilayer barrier sheet of the present invention the inner barrier layer, first polyolefin layer, propylene polymer layer and styrene polymer layer may be bonded by interposed layers of a suitable adhesive. The adhesive layers may vary in thickness from about 0.5 to about 2 mils, however, generally the preferred thickness of any adhesive layer is about 0.75 to about 1.5 mils.

A wide variety of polymers and polymeric compositions are useful as adhesive layers to provide adhesion between the various layers of the sheet. Suitable polymers or polymeric compositions which may be employed are copolymers of ethylene and vinyl acetate, advantageously in proportions of from 14 weight percent to 40 weight percent vinyl acetate with from 86 weight percent to 60 weight percent ethylene, and copolymers of ethylene with isobutyl acrylate, advantageously in proportions of from 10 to 30 weight percent isobutyl acrylate with from 80 to 70 weight percent of ethylene.

It is also critical to the practice of the present invention that the propylene polymer used in the construction of the multilayer sheet have incorporated therein about 20 to about 40 percent by weight of a filler and that the filled propylene polymer layer and the styrene polymer layer have a melt flow that is substantially equal to the other. Generally the melt flow of the filled propylene polymer and styrene polymer compositions is in the range of about 1.5 to about 3.0 g/10 minutes (ASTM test method D1238) and preferably about 2.0 to about 2.8 g/min.

As will hereinafter be illustrated, if concentrations of filler outside the ranges specified above are incorporated in the propylene polymer composition, and if the thickness ratio of the filled propylene polymer to styrene polymer is outside the range of 60:40 to 40:60, the multilayer sheet formed using these compositions will exhibit poor formability properties, such as wall thickness variation, poor conformity to the mold cavity and once thermoformed, the containers prepared therefrom will exhibit distortion and excessive shrinkage when exposed to microwave conditions.

This invention is illustrated by the following examples:

EXAMPLE 1

A multilayer sheet was prepared by coextrusion of an inner barrier layer composed of about 82 weight percent vinylidene chloride and about 18 weight percent vinyl chloride, adhesive layers applied to opposite sides of the barrier layer comprised of an ethylene-vinyl acetate copolymer containing 28 weight percent vinyl acetate, an outer layer of a low density polyethylene bonded to one surface of the barrier layer through an intermediate adhesive layer, a propylene copolymer filled with 30 percent by weight talc (average particle size 8 microns) having a melt flow of 2.2 g/10 min. (ASTM test method D1238) bonded to the other surface of the barrier layer through an intermediate adhesive layer and a high impact polystyrene composition (Mobil 4600) have a melt flow of 2.7 g/min. adhered through an intermediate adhesive layer to the filled polypropylene layer. The polyethylene layer was 9.0 mils thick. The filled polypropylene and high impact polystyrene layers were each 17 mils thick, the inner barrier layer was 4.0 mils thick, and the adhesive layers were each 1.0 mil thick. The molten polymers were coextruded from a conventional extruder through a flat sheet die, the melt streams being combined in a coextrusion block prior to being extruded from the die.

To prepare containers, the finished multilayer coextrudate was preheated to about 375° F. and thermoformed into flanged eight ounce cups having a sidewall thickness of 12-18 mils, with the low density polyethylene layer forming the food contact side of the cup, using conventional thermoforming equipment.

The multilayer sheet exhibited excellent formability properties, namely, cups thermoformed from the sheet had uniform wall thickness and conformity to the mold cavity.

The thermoformed cups when filled with water and the water heated to boiling in a Litton microwave oven having an output of 1600 watts did not exhibit any distortion, shrinkage, or any other sign of dimensional instability. The cups filled with water and sealed with a flexible plastic membrane also exhibited excellent abuse strength, i.e., when subjected to a Drop Test, i.e. the filled cup being dropped from an inclined surface (15° angle) of 41 inches in length striking a base plate at a 90° angle to the direction of fall, the cups did not split or rupture.

By way of contrast when the procedure of Example 1 was repeated with the exception that the thickness of the filled polypropylene layer was 9 mils and the thickness of the high impact polystyrene layer was 25 mils or a thickness ratio of 74:26, the microwaveability of containers thermoformed from the multilayer sheet was significantly reduced, namely the containers distorted when subjected to exposure in a microwave oven. Abuse strength was poor, that is, many of the cups filled with water and sealed with a plastic membrane ruptured when subjected to the Drop Test.

By way of contrast when the procedure of Example 1 was repeated with the exception that the thickness of the polypropylene layer was 25 mils and the high impact polystyrene layer was 9 mils, or a thickness ratio of 26:74, containers formed from the multilayer sheet were difficult to thermoform and had non-uniform wall thickness.

By way of further contrast when the procedure of Example 1 was repeated with the exception that a talc concentration in excess of 40 percent by weight was incorporated in the polypropylene layer, the multilayer sheet exhibited poor formability during thermoforming operations.

EXAMPLE 2

The procedure of Example 1 was repeated with the exception that the polyethylene and barrier layers were absent from the multilayer structure and the multilayer sheet was constructed primarily of high impact polystyrene bonded to the filled polypropylene layer through an intermediate ethylene vinyl acetate copolymer adhesive layer. The thickness of the high impact polystyrene layer was 23 mils, the thickness of the EVA adhesive layer was 1 mil and the thickness of the filled polypropylene layer was 23 mils.

The multilayer sheet was readily thermoformed into cups of uniform wall thickness and conformity to the mold cavity.

What is claimed is:

1. A multilayer plastic sheet suitable for the manufacture of containers which can withstand exposure to microwave heating of product contained therein without significant loss of dimensional stability, the sheet being comprised of at least one layer of a propylene polymer bonded to a styrene polymer layer, the propylene polymer layer having incorporated therein about 20 to about 40 percent by weight of an inorganic filler, the filled propylene polymer and styrene polymer layers having melt flows substantially equal to the other and the thickness of the layers being at a ratio of about 60:40 to 40:60.

2. The sheet of claim 1 wherein the filler is talc.

3. The sheet of claim 1 wherein the propylene polymer is polypropylene.

4. The sheet of claim 1 wherein the styrene polymer is high impact polystyrene.

5. The sheet of claim 4 wherein the melt flow of the filled propylene polymer and the high impact polystyrene are both in the range of about 1.5 to about 3.0 g/10 min.

6. The sheet of claim 4 wherein the melt flow of the filled propylene polymer and the high impact polystyrene are both in the range of about 2.0 to about 2.8 g/10 min.

7. A plastic container which can withstand exposure to microwave heating of product contained therein without significant loss of dimensional stability, the container being formed from a multilayer sheet comprised of at least one layer of a propylene polymer bonded to a styrene polymer layer, the propylene polymer layer having incorporated therein about 20 to 40 percent by weight of an inorganic filler, the filled propylene polymer and styrene polymer layers having melt flows substantially equal to the other and the thickness of the layers being at a ratio of about 60:40 to 40:60.

8. The container of claim 7 wherein the filler is talc.

9. The container of claim 7 wherein the propylene polymer is polypropylene.

10. The container of claim 7 wherein the styrene polymer is high impact polystyrene.

11. The container of claim 7 wherein the melt flow of the filled propylene polymer and the high impact polystyrene are both in the range of about 1.5 to about 3.0 g/10 min.

12. The container of claim 7 wherein the melt flow of the filled propylene polymer and the high impact polystyrene are in the range of about 2.0 to about 2.8 g/10 min.

* * * * *